May 17, 1960   B. A. KINDRED   2,936,779
FLAPPER VALVE
Filed Oct. 11, 1956
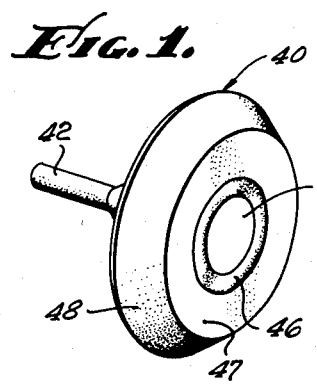
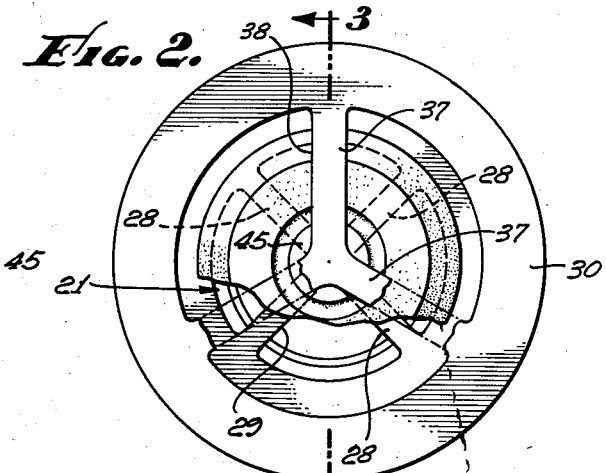
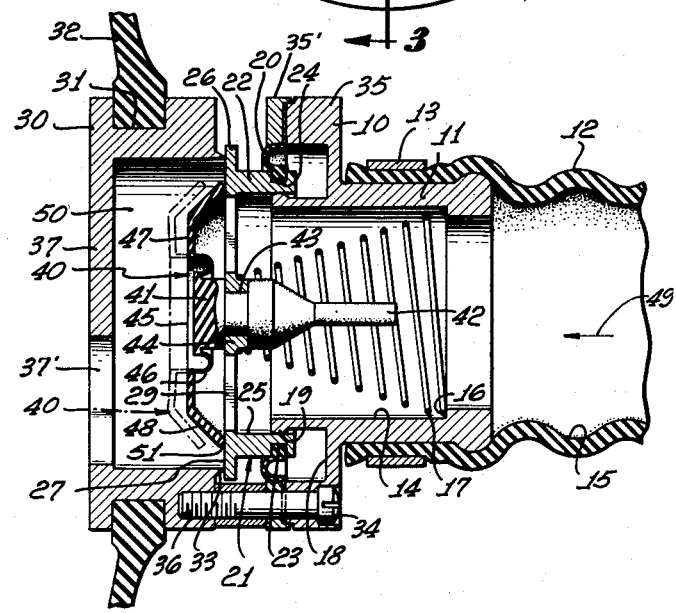
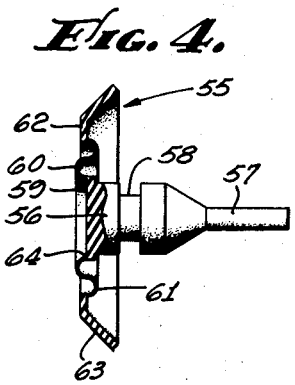
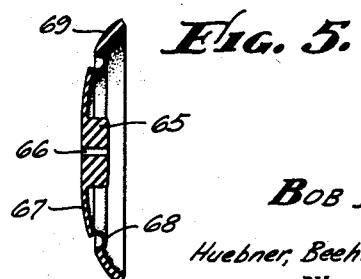
BOB A. KINDRED
INVENTOR.
Huebner, Beehler, Worrel & Herzig.
BY
Vernon D. Beehler
ATTORNEYS.

United States Patent Office 2,936,779
Patented May 17, 1960

2,936,779

FLAPPER VALVE

Bob A. Kindred, Duarte, Calif., assignor to Sierra Engineering Co., Sierra Madre, Calif., a corporation of California Application October 11, 1956, Serial No. 615,286

8 Claims. (Cl. 137—525)

The invention relates to valve devices and has particular reference to a valve structure especially well adapted for use in breathing apparatus because of the sensitivity of operation which enables the valve to open and close effectively under relatively light fluid pressure.

The demands brought about by increase in the use of breathing apparatus have pointed out limitations in valve devices heretofore employed. Where oxygen masks are required, such devices are now employed under circumstances which place a far greater demand on dependability of performance than has heretofore been required. High altitude flying is one of those circumstances.

On the other hand, due to increased employment of various gases for anesthesia, valves heretofore considered sufficient for average purposes have been found to lack the ability on some occasions to pass a sufficient amount of fluid while at the same time being capable of a positive instantaneous shut-off, thereby to check flow periodically in a reverse direction.

Moreover, valves heretofore in use for the most part have a relatively high resistance to the flow of air which results in an unncessarily high pressure drop past the valve. Where space and size is at a premium valves large enough to pass the quantity of air needed have been objectionable as too bulky for many installations and needlessly high in cost.

It is therefore among the objects of the invention to provide a new and improved valve device which is sensitive to the extent of quickly assuming a maximum full flow position under relatively light pressure but which will close off virtually instantaneously as promptly as flow ceases and a back pressure tends to develop.

Another object of the invention is to provide a new and improved valve element for use in a valve device which is so constructed that portions of the valve element flex to the extent of permitting the valve element as a whole to move first at one area under ordinary circumstances and then at another area under extreme circumstances to admit passage of the fluid and which will also return rapidly and positively to an initial position as a result of inherent flexure of the valve element.

Still another object of the invention is to provide a new and improved valve device which incorporates an inherently flexible valve element capable of moving over a wide range of movement, thereby to assure full flow of fluid through the valve device but which is of such character that movement of metal or other parts of the valve device is virtually eliminated, thereby greatly prolonging the useful and dependable life of the device.

Still another object of the invention is to provide a combined valve device and inherently flexible valve element which by reason of its configuration and inherent resiliency makes possible a substantially maximum flow through fluid passages which can be kept to substantially a minimum inside diameter without undue restriction.

Another object still is to provide a new and improved flapper type valve which opens under the merest suggestion of pressure differential thereby to minimize pressure drop through the valve and at the same time to provide ample space for passage of a full flow of gas.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a perspective view of the valve element.

Figure 2 is a plan view of the valve device incorporating the valve element.

Figure 3 is a longitudinal sectional view of the valve device taken on the line 3—3 of Figure 2.

Figure 4 is a longitudinal sectional view of a modified form of the valve element.

Figure 5 is a longitudinal sectional view of still another modified form of the valve element.

In a form of the device chosen for the purpose of illustration there is provided a composite valve body adapted to the flow of gaseous fluids in particular, such as air, oxygen, and anesthetic gases. The composite body consists generally of a fitting 10 having an extension 11 over which a hose 12 is clamped by means of a clamp 13. The extension provides a fluid passage 14 which communicates with a passage 15 of the hose. A shoulder 16 at the outer end of the passage 14 provides means for supporting a conical spring 17.

At the opposite end of the fitting is an annular recess 18 on the inner wall of which is a bead 19. A thin pliable diaphragm 20 has a ring portion 24 inserted into an annular recess 23. The diaphragm 20 also has a flat annular outer ring-shaped portion which is clamped in place between a flange 35 of fitting 10 and a clamping ring 35'. The inner wall 25 of the skirt surrounds and lies in engagement with the bead 19 previously referred to.

At the end of the sleeve opposite from the recess 23 is a flange 26 having a flat face 27 which may be smooth-surfaced and annular. At the end of the sleeve adjacent the flange are spider element 28, four in number in the example illustrated, and which provide between them fluid ports 29.

In the chosen form of the invention there is employed a bonnet 30 recessed as at 31 to engage a portion 32 of a mask. The bonnet includes an annular knife edge 33 so positioned that it engages the smooth face 27 of flange 26. The knife edge which makes an annular line contact seal is drawn into sealing engagement by means of bolts 34 which extend through the flange 35 of the fitting 10 into a suitable tapped hole 36 of the bonnet 30. Bars 37 on the bonnet provide spaces 37' between them which admit flow of fluid therethrough.

A valve element 40 in the chosen embodiment includes a central boss 41 to which is attached a valve stem 42. The valve stem has a recess 43 receivable in a hub 44 of the sleeve 21.

The valve element includes a central area 45 adjacent the boss 41 which at its perimeter engages a hollow bead 46. At its outer perimeter the bead joins an annular area 47 which is slightly thicker in section than the section through the hollow bead. At the outer perimeter of the annular area is an annular skirt 48.

Normally the valve element and its several parts occupy the solid line position of Figure 3. It can be assumed that fluid, usually gaseous fluid, flows in the direction of the arrow 49 from the hose 12 into the valve device. As this fluid under pressure impinges against the under-side of the valve device 40, pressure will tend to distort the valve element. The distortion results in displacement of the valve from the solid line position of Figure 3 to the broken line position of Figure 3. Virtually all initial movement which takes place in the inherently resilient valve element takes place in the material which forms the hollow bead 46. This admits of what is virtually bodily movement of the valve element to the dotted line position, thereby admitting a free flow of fluid around the skirt from the passage 15 through the passage 14 and into the chamber 50. From the chamber 50 the flow of fluid is through the spaces 38. Because of the substantially large perimeter of a rim 51 of the skirt, when the skirt, and incidentally the valve element, is lifted to the position shown by the broken line, there will be ample passage for liquid under the rim of the skirt.

Should the pressure in direction from right to left be great, necessitating a greater opening of the passage, the wall of the skirt will turn downstream as a result of flexure of the annular area 47, thereby providing additional space past the valve element.

As promptly as flow ceases the inherent resiliency of the disc will exercise itself first in the annular area 47, if indeed the skirt 48 has not in fact been disturbed, after which the material of the hollow bead 46 will force return of the valve element to the initial full line position wherein the rim 51 has a perimetrical sealing engagement with the face 27 of the sleeve 21. Since the valve element is of very light-weight rubber or rubber-like synthetic or plastic material, the flexures described can be repeated many thousands of times before there is any material wear or decrease in effectiveness. It will be noted that because of the thin section of the hollow bead, there will be sufficient initial movement to take care of almost all ordinary circumstances inasmuch as this permits a displacement of the position of the valve disc sufficient to pass virtually all of the gas under ordinary pressure conditions. Where pressure conditions change, however, and more gas than usual is passed, flexures of the portions of the valve disc which are slightly thicker in section take place in the order of increasing thickness. Conversely when the parts of the valve element return to initial position, portions of heavy thickness return first followed by the portions of lesser thickness.

In a second form of the invention illustrated in Figure 4 a valve element 55 comprises a central boss 56 to which is attached a composite stem 57.

In the stem is an annular recess 58 to provide for engagement of the stem with the spider in the composite valve body. More properly the valve element includes a central portion 59 at the perimeter of which are a pair of hollow beads 60 and 61 which face in opposite directions. At the outer perimeter of the bead 61 is an annular area 62 at the outer perimeter of which is an annular skirt 63. A central area 64 of somewhat thicker section completes the valve element. It should be noted that the thickness of the outer portion is materially greater than the thickness of the hollow beads and may, if desired, vary to a limited extent throughout the area of the outer portion. Thus constructed the double hollow bead structure which provides more material of very thin section admits of greater bodily movement of the valve element as a whole when subjected to pressure applied to the underside. Similarly also should the pressure be greater than ordinarily expected, the annular area 62 will then flex, permitting displacement of the annular bead 63, which in turn may flex to a degree if need be. Return follows the usual pattern whereby the heavier sections return to initial position first.

In still another embodiment of the structure of the valve disc as shown in Figure 5 there is a central boss 65 having an aperture 66 therethrough by means of which the valve may be attached to a valve stem not shown. Surrounding the boss is a central annular area 67, at the outer perimeter of which is a hollow bead 68 of thinnest section. The annular area 67 may be arcuate as shown, the arc of which continues in an arcuate skirt 69. It will be noted that as shown the skirt is thickest in section followed successfully by the annular area 67 and then the hollow bead 68.

Hence, when a valve of this type is subjected to pressure against the underside, the hollow beaded portion will first flex, thereby permitting bodily movement of the skirt section before there is any flexure or movement of the annular area 67. Continued greater pressure against the underside of the valve element will then result in flexure of the annular area 67, permitting the skirt to turn to a slight degree. The turning will continue further as a result of flexure of the skirt 69 under conditions where even greater fluid or gas pressure might be applied.

It will be noted from the description that by making the valve element of a resilient, flexible, light-weight section, an extremely sensitive but positive-acting valve element can be combined with a valve structure in such fashion that it is sensitive to a degree unmatched by structure heretofore devised. The combined body structure permits of ready mounting of the sensitive valve and provides a smooth seat on which the rim of the skirt can engage, thereby to assure a positive shut-off under reverse flow conditions. When the device is assembled, the parts are easily engaged one with respect to the other and firmly tightened in sealing position by use of the bolts 34. On those occasions where it might become necessary to disassemble the valve device, the bolts can be removed and the three parts of the valve readily separated one from another, thereby to give access to the interior for replacement of the valve element if need be or other servicing. Such disengagement can be accomplished without disturbing the attachment of the hose 12 or the attachment of the mask 32.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A valve device comprising a composite valve body having a fluid passage therethrough and a flap valve in said passage adapted to open with the passage of fluid in one direction and to close with the passage of fluid in the opposite direction, said composite valve body comprising a fitting having one end adapted for attachment to a hose, a sleeve having a sealed connection to the fitting, a bonnet having a valve chamber therein, an annular seal on the bonnet in sealing engagement with said sleeve and connection means attaching said bonnet to said fitting, said sleeve having an annular surface forming a valve seat, and a valve element comprising a disc having the center thereof retained in said sleeve, a concentric annular area of said disc surrounding and spaced from the center, an annular corrugation of relatively thinner section connected respectively to the center and said annular area and a skirt of relatively thicker section at the perimeter of said annular area having a rim extending into sealing engagement with said valve seat, said corrugation when the valve element is subjected to pressure against the side thereof beneath the skirt being adapted to flex first whereby to enable said stem to remain in fixed position and to enable lifting of said skirt bodily to open the passage to flow of fluid.

2. A valve element comprising a disc, a central mounting area for the disc, a concentric annular area of said disc surrounding said mounting area and spaced therefrom, an annular corrugation relatively thinner than the remainder of the disc connecting the outer perimeter of the mounting area and the inner perimeter of said annular area and an annular skirt at the outer edge of said annular area having a sealing line at the perimeter, said valve element when subjected to pressure against the side thereof beneath the skirt being adapted to flex with parts thereof flexing in successive order with the corrugation flexing in advance of flexure of parts of relatively thicker section whereby to effect opening movement of the valve element.

3. A valve device comprising a composite valve body having a fluid passage therethrough and a flap valve in said passage adapted to open with the passage of fluid in one direction and to close with the passage of fluid in the opposite direction, said composite valve body comprising a fitting member having one end adapted for attachment to a hose and having a valve seat at the other end, a bonnet having a valve chamber therein, an annular area on the bonnet in sealing engagement with said fitting and connection means releasably attaching said bonnet to said fitting, and a valve element comprising a disc secured at the center to said fitting member, a concentric annular area of said disc surrounding the center at a location spaced therefrom, an annular corrugation relatively thinner than the remainder of the disc connected respectively to the center and the inner perimeter of said annular area, a skirt of relatively thicker section at the outer perimeter of said annular area and extending into sealing engagement with said valve seat, said valve element when subjected to pressure against the side thereof beneath the skirt being adapted to flex at the corrugation whereby to elevate said skirt bodily relative to the center and to open the passage to flow of fluid.

4. In combination with a flat annular valve seat and a central connection a flexible disc valve element comprising parts of flexible resilient material including a mounting area at the center of the disc, an annular corrugation of relatively thin section surrounding said mounting area, an annular area of relatively thicker section surrounding and joined to said corrugation, and an obliquely extending skirt of section thickness comparable to the thickness of said annular area surrounding and joined by said corrugation to said central area, said skirt having an edge adapted to extend into sealing engagement with said valve seat, said disc being adapted to flex when subjected to pressure against the underside of the skirt whereby parts thereof are flexed in successive order with the thinnest parts flexing in advance of the thicker parts.

5. In combination with an annular valve seat and a central connection a flexible disc valve element comprising parts of flexible resilient material including a composite central area and a pair of concentric hollow annular corrugations of relatively thin section joined at adjacent perimeters in oppositely facing directions, an annular element of relatively thicker section surrounding and joined to one of said corrugations, and an obliquely extending skirt of section thickness comparable to the thickness of the annular element surrounding and joined to said composite central area, said skirt having an edge adapted to extend into sealing engagement with said valve seat, said disc being adapted to flex when subjected to pressure against the underside of the skirt whereby parts thereof are adapted to flex in successive order with the thinnest parts flexing in advance of the thicker parts.

6. A valve element comprising a central mounting member, an annular member concentric with respect to the mounting member and having a space therebetween, said annular member having an annular valve seating portion, and an annular connecting section connecting said mounting member with said annular member, said connecting section having a breadth greater than the breadth of said space between said members, said connecting section being folded in said space and subject to flexure whereby to enable said annular member to move bodily relative to the mounting member between open and closed positions of the valve element.

7. A valve device comprising rigid supporting structure having an annular valve seat thereon and a central valve retainer, a valve element comprising a mounting portion fastened to said valve retainer, an annular portion having a preselected form concentric with respect to said mounting and spaced outwardly therefrom, said annular portion having an annular rim normally engaging said valve seat, and an annular connecting section joining said mounting portion with said annular portion, said connecting section being of relatively greater flexibility than said portions whereby to flex first and enable said annular portion to retain its form and to move bodily axially relative to the mounting portion and the valve seat between open and closed positions of the valve element.

8. A valve device comprising rigid supporting structure having an annular valve seat thereon and a central valve retainer, a valve element comprising a mounting member fastened to said valve retainer, an annular member concentric with respect to the mounting member and providing a space between the annular member and the mounting member, said annular member having an annular rim engageable with said valve seat, and an annular connecting section joining said mounting member with said annular member, said connecting section being of greater breadth than said space and folded into said space whereby to enable said annular member to move bodily relative to the mounting member between open and closed positions of the valve element.

References Cited in the file of this patent

UNITED STATES PATENTS

| | | |
|---|---|---|
| 2,133,575 | Rosenberg | Oct. 18, 1938 |
| 2,168,695 | Asari | Aug. 8, 1939 |
| 2,225,395 | Young | Dec. 17, 1940 |
| 2,646,063 | Hayes | July 21, 1953 |
| 2,672,293 | Ludlow | Mar. 16, 1954 |

FOREIGN PATENTS

| | | |
|---|---|---|
| 734,899 | Germany | Apr. 30, 1943 |
| 622,821 | Great Britain | May 9, 1949 |